US012269279B2

(12) United States Patent
Miyasaka

(10) Patent No.: US 12,269,279 B2
(45) Date of Patent: Apr. 8, 2025

(54) PRINTING DEVICE AND PRINTING DEVICE CONTROL METHOD

(71) Applicant: SEIKO EPSON CORPORATION, Tokyo (JP)

(72) Inventor: Atsushi Miyasaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 157 days.

(21) Appl. No.: 18/317,284

(22) Filed: May 15, 2023

(65) Prior Publication Data

US 2023/0373232 A1 Nov. 23, 2023

(30) Foreign Application Priority Data

May 17, 2022 (JP) ................................. 2022-080700

(51) Int. Cl.

| | |
|---|---|
| ***B41J 25/34*** | (2006.01) |
| ***B41J 2/07*** | (2006.01) |
| ***B41J 19/20*** | (2006.01) |
| ***B41J 29/393*** | (2006.01) |
| ***B65H 18/10*** | (2006.01) |
| ***B65H 20/02*** | (2006.01) |
| *B41J 2/21* | (2006.01) |

(52) U.S. Cl.

CPC ................. *B41J 25/34* (2013.01); *B41J 2/07* (2013.01); *B41J 19/202* (2013.01); *B41J 29/393* (2013.01); *B65H 18/103* (2013.01); *B65H 20/02* (2013.01); *B41J 2/21* (2013.01); *B41J 19/207* (2013.01)

(58) Field of Classification Search

CPC ... B41J 25/34; B41J 2/07; B41J 19/202; B41J 29/393; B41J 2/21; B41J 19/207; B65H 18/103; B65H 20/02

See application file for complete search history.

(56) References Cited

U.S. PATENT DOCUMENTS

2006/0170720 A1* 8/2006 Akase ...................... B41J 29/38 347/14
2006/0268043 A1* 11/2006 Akiyama ............... B41J 19/202 347/19
2007/0216718 A1* 9/2007 Mizuno .................. B41J 29/393 347/16
2020/0376833 A1* 12/2020 Sato ..................... B41J 2/04503
2021/0078345 A1* 3/2021 Kiriyama ........... G01D 5/34753

FOREIGN PATENT DOCUMENTS

JP H09-234925 A 9/1997

* cited by examiner

*Primary Examiner* — Henok D Legesse
(74) *Attorney, Agent, or Firm* — WORKMAN NYDEGGER

(57) ABSTRACT

The printing device includes a support section 17 for supporting a medium 99, a head 28 for ejecting liquid on a print region 19, a carriage 27 on which the head is mounted, a guide 25 for supporting the carriage, a motor for moving the carriage, a rotary encoder, a linear encoder 35 for detecting the position of the carriage, and a control section. The linear encoder has a linear scale 36 and a sensor 37, the linear scale has a first region S1 where slits 38 are positioned and a second region S2 where the slits are not positioned, and when the head faces the printing region, the sensor is positioned in the first region, and the length of the first region in one direction is equal to or longer than the length of the printing region in one direction.

8 Claims, 7 Drawing Sheets

PRINTING DEVICE AND PRINTING DEVICE CONTROL METHOD

The present application is based on, and claims priority from JP Application Serial Number 2022-080700, filed May 17, 2022, the disclosure of which is hereby incorporated by reference herein in its entirety.

BACKGROUND

1. Technical Field

The present invention relates to a printing device and a printing device control method.

2. Related Art

JP-A-9-234925 describes a printing device in which the ejection timing of liquid ejection by a head is controlled by a linear scale having a plurality of slits.

In such a printing device, the linear scale becomes longer as the size of the apparatus increases. When the linear scale is long, the positional accuracy of the slits is likely to decrease. This is because, as the linear scale becomes longer, it becomes more difficult to form the slits at uniform intervals over the entire length of the linear scale. Therefore, when the linear scale is long, the printing quality is likely to be degraded.

SUMMARY

A printing device that overcomes the above issues includes a support section configured to support a medium; a head configured to eject liquid onto a print region of the medium, the print region being a region of the medium that is supported by the support section; a carriage on which the head is mounted; a guide that supports the carriage and that extends in one direction; a motor configured to move the carriage along the guide between a home position and a return position; a rotary encoder for detecting a rotation angle of the motor; a linear encoder configured to detect a position of the carriage; and a control section, wherein the control section controls a position of the carriage based on output of the rotary encoder and controls ejection timing of liquid by the head based on output of the linear encoder, the support section faces the head by the carriage moving between the home position and the return position, the linear encoder includes a linear scale that extends in the one direction and that has a plurality of slits arranged in the one direction and a sensor that is attached to the carriage and that is configured to detect the slits, by movement of the carriage, the sensor moves over the linear scale between a first position and a second position, the first position is a position on the linear scale where the sensor is located when the carriage is located at the home position, the second position is a position on the linear scale where the sensor is located when the carriage is located at the return position, the linear scale includes, between the first position and the second position, a first region in which the plurality of slits are located and a second region in which the plurality of slits are not located, the sensor is located in the first region when the head faces the print region, and a length of the first region in the one direction is greater than or equal to a length of the print region in the one direction.

A printing device control method for overcoming the above issues is a printing device control method for a printing device including a support section configured to support a medium, a head configured to eject liquid onto a print region of the medium, the print region being a region of the medium that is supported by the support section, a carriage on which the head is mounted, a guide that supports the carriage and that extends in one direction, a motor configured to move the carriage along the guide between a home position and a return position, a rotary encoder for detecting a rotation angle of the motor, and a linear encoder configured to detect a position of the carriage, the support section faces the head by the carriage moving between the home position and the return position, the linear encoder includes a linear scale that extends in the one direction and that has a plurality of slits arranged in the one direction and a sensor that is attached to the carriage and that is configured to detect the slits, by movement of the carriage, the sensor moves over the linear scale between a first position and a second position, the first position is a position on the linear scale where the sensor is located when the carriage is located at the home position, the second position is a position on the linear scale where the sensor is located when the carriage is located at the return position, the linear scale includes, between the first position and the second position, a first region in which the plurality of slits are located and a second region in which the plurality of slits are not located, the sensor is located in the first region when the head ejects liquid at the print region, and a length of the first region in the one direction is longer than a length of the print region in the one direction, the printing device control method comprising: controlling position of the carriage based on output of the rotary encoder; controlling ejection timing of the liquid by the head based on output of the linear encoder; and when the sensor moves from the second region to the first region, output of the linear encoder is reset before the head ejects liquid to the printing region.

DESCRIPTION OF EMBODIMENTS

Hereinafter, an embodiment of a printing device will be described with reference to the drawings. The printing device is, for example, an ink jet printer that prints images such as characters or photographs by ejecting ink, which is an example of liquid, onto a medium such as paper or fabric. The printing device is, for example, a label printer.

Configuration of Printing Device

Figure 1:
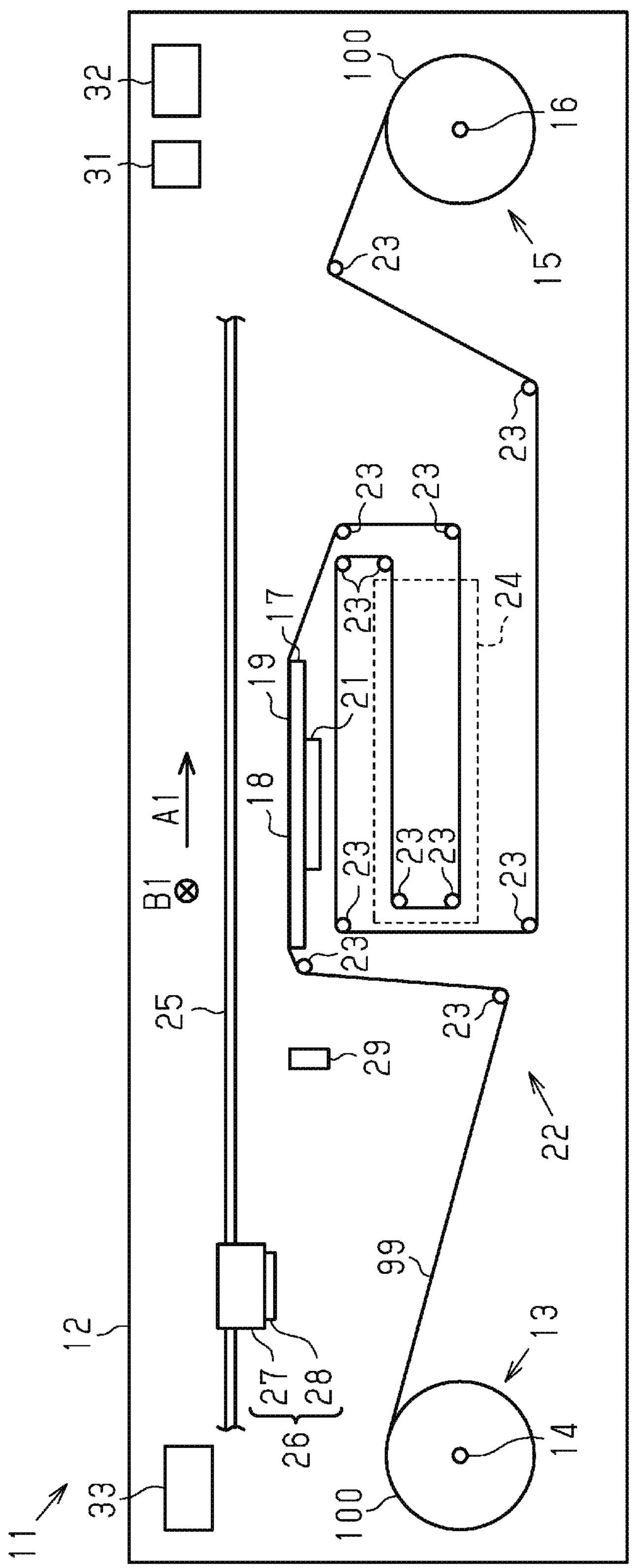
FIG. 1 is a front view showing an embodiment of a printing device.

As shown in FIG. 1, the printing device 11 includes a housing 12. The printing device 11 includes a feeding section 13. The feeding section 13 is configured to feed a medium 99. The feeding section 13 is accommodated in the housing 12, for example. The feed section 13 has a feed shaft 14. The feeding shaft 14 rotatably holds a roll body 100 into which the medium 99 is wound. The feeding shaft 14 holds the medium 99 before it is printed on. The medium 99 is fed out from the feeding section 13 with rotation of the feeding shaft 14. The feeding shaft 14 may be driven to rotate by a motor, or may be driven to rotate as the medium 99 is drawn out.

The printing device 11 includes a winding section 15. The winding section 15 is configured to wind up the medium 99. The winding section 15 is accommodated in the housing 12, for example. The winding section 15 has a winding shaft 16. Similarly to the feeding shaft 14, the winding shaft 16 rotatably holds a roll body 100. The winding shaft 16 holds the medium 99 after it has been printed on. The winding section 15 winds up the medium 99 as the winding shaft 16 rotates. The winding shaft 16 is driven to rotate by, for example, a motor.

The printing device 11 includes a support section 17. The support section 17 supports the medium 99. The support section 17 is accommodated in the housing 12, for example. For example, the support section 17 supports the medium 99 from below. The support section 17 supports the medium 99 during the process from when the medium 99 is fed from the feeding section 13 to when the medium 99 is wound up by the winding section 15.

The support section 17 has a support surface 18. The support surface 18 is a surface of the support section 17 that comes into contact with the medium 99. The support surface 18 faces upward in the support section 17, for example. When the support section 17 is viewed from a position facing the support surface 18, that is, when the support section 17 is viewed from above the support section 17, the support surface 18 overlaps the medium 99.

Figure 2:
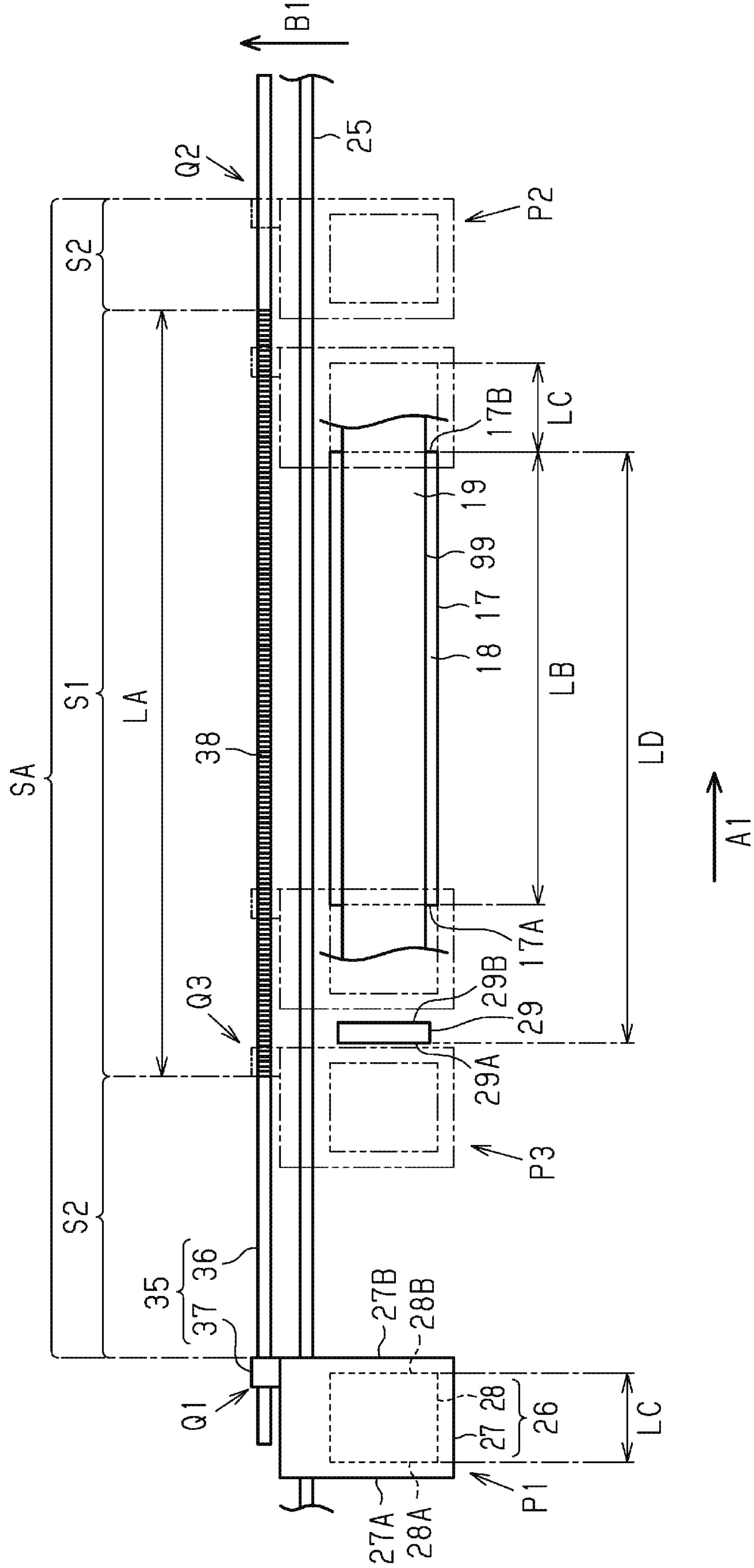
FIG. 2 is a plan view of the printing device.

As shown in FIG. 2, the support section 17 has two end sections with respect to one direction. The support section 17 has, for example, a first support end section 17A and a second support end section 17B with respect to the one direction. Specifically, the support section 17 has a first support end section 17A and a second support end section 17B with respect to a first direction A1. The first direction A1 indicates a direction in which the medium 99 moves over the support section 17. The first direction A1 is a direction in which the support surface 18 extends. Of the two end sections, the first support end section 17A is the one closer to a home position P1 (to be described later). Of the two end sections, the second support end section 17B is the one closer to a return position P2 (to be described later).

As shown in FIG. 1, a region of the medium 99 that is supported by the support section 17 is a print region 19. In the printing device 11, printing is performed on the print region 19 of the medium 99. The print region 19 is the region of the medium 99 that overlaps the support section 17 when the support section 17 is viewed from a position facing the support surface 18. In other words, the print region 19 overlaps the support surface 18 in a plan view of the support section 17. The print region 19 is, for example, the entire region of the medium 99 supported by the support section 17. The print region 19 is not limited to the entire region of the medium 99 supported by the support section 17, and may be a portion of the region supported by the support section 17. The print region 19 refers to a maximum region in which the printing device 11 can perform printing in a region supported by the support section 17.

The printing device 11 may include an attraction section 21. The attraction section 21 is configured to attract the medium 99 to the support section 17. The attraction section 21 causes the medium 99 to cling to the support section 17 by, for example, sucking the medium 99 through the support section 17. The attraction section 21 includes, for example, a suction pump. The attraction section 21 sucks the medium 99 through, for example, through-holes opened in the support surface 18. By this, the medium 99 clings to the support surface 18. The attraction section 21 may attract the medium 99 toward the support section 17 by generating static electricity, for example.

The attractive force of the attraction section 21 can be changed by, for example, controlling the suction force. For example, the attraction section 21 changes the attractive force in accordance with the transport of the medium 99. For example, while the medium 99 is being transported, the attraction section 21 reduces the attractive force compared to when the transport of the medium 99 is stopped. While the medium 99 is being transported, the attraction section 21 relatively reduces the attractive force. By making the attractive force of the attraction section 21 relatively small while the medium 99 is being transported, the medium 99 easily moves over the support section 17. While printing is being performed on the medium 99, that is, when the transport of the medium 99 is stopped, the attraction section 21 relatively increases the attractive force. By making the attractive force of the attraction section 21 relatively large while the transport of the medium 99 is stopped, the position of the medium 99 on the support section 17 is less likely to be displaced.

The printing device 11 includes a transport section 22. The transport section 22 is configured to transport the medium 99. The transport section 22 is accommodated in the housing 12, for example. The transport section 22 transports the medium 99 from the feeding section 13 toward the winding section 15. The transport section 22 transports the medium 99 in the first direction A1 over the support section 17.

The transport section 22 transports the portion of the medium 99 that has passed over the support section 17 downward from the support section 17. That is, the medium 99 on which printing has been completed is transported by the transport section 22 from the support section 17 further downward than the support section 17.

The transport section 22 intermittently transports the medium 99. That is, the transport section 22 repeats start of transport and stop of transport. While printing on the medium 99 is being executed, the transport section 22 stops transporting the medium 99. While printing on the medium 99 is not executed, for example, when printing on the medium 99 is completed, the transport section 22 starts transporting the medium 99. In the printing device 11, printing on the medium 99 and transport of the medium 99 are alternately repeated.

The transport section 22 includes one or more transport rollers 23. The transport rollers 23 are located, for example, in the housing 12. The transport rollers 23 transport the medium 99 by rotating. The medium 99 winds around the transport rollers 23. The transport rollers 23 may sandwich the medium 99. The medium 99 is transported by the rotation of the transport rollers 23. The transport rollers 23 include, for example, a roller driven to rotate by a motor. The transport rollers 23 are located lower than is the support surface 18, for example.

The printing device 11 includes a drying section 24. The drying section 24 is configured to dry the printed-on medium 99. The drying section 24 dries the medium 99 during the process of the medium 99 being transported from the support section 17 to the winding section 15. The drying section 24 is located, for example, in the housing 12. For example, the drying section 24 is located immediately below the support section 17. The drying section 24 includes, for example, a heater that heats the medium 99. The drying section 24 may include a fan that blows a gas at the medium 99. By this, the drying section 24 dries the medium 99.

The printing device 11 includes a guide 25. The guide 25 is housed in the housing 12. The guide 25 is supported by, for example, a frame in the housing 12. The guide 25 extends in one direction. For example, the guide 25 extends in one direction in a region above the support section 17. The guide 25 is, for example, a rod elongated in one direction. The guide 25 extends, for example, in the first direction A1. The guide 25 may extend in a second direction B1. The second direction B1 is a direction different from the first direction A1. The second direction B1 is a direction intersecting the first direction A1 in a plane along the support surface 18. The second direction B1 is a direction in which the support surface 18 extends. That is, the support surface 18 extends in the first direction A1 and in the second direction B1.

The printing device 11 includes a printing section 26. The printing section 26 is supported by the guide 25. The printing section 26 is configured to print on the medium 99. The printing section 26 performs printing on the medium 99 by ejecting liquid onto the medium 99. The printing section 26 performs printing in the print region 19. The printing section 26 is accommodated in the housing 12, for example. The printing section 26 includes a carriage 27 and one or more heads 28. The carriage 27 and the head 28 are located, for example, higher than the support section 17.

The head 28 is mounted on the carriage 27. The carriage 27 is configured to move relative to the medium 99. The carriage 27 moves relative to the print region 19. The carriage 27 moves in a region facing the support section 17. The carriage 27 moves so as to pass through the print region 19, as seen from a plan view of the support section 17. For example, the carriage 27 moves in a region higher than the support section 17.

The carriage 27 is supported by the guide 25. The carriage 27 moves along the guide 25. Therefore, the carriage 27 moves in the first direction A1, for example. Specifically, the carriage 27 reciprocates in the first direction A1. That is, the carriage 27 moves in the first direction A1 and in the direction opposite thereto. Therefore, the carriage 27 moves in the direction in which the medium 99 moves on the support section 17. Therefore, the printing device 11 is a so-called lateral printer.

The carriage 27 may be configured to move in the second direction B1. In this case, the guide 25 would extend in the second direction B1. When the guide 25 extends in the second direction B1, the printing device 11 is a so-called serial printer. In the serial printer, the carriage 27 reciprocates in the second direction B1. That is, in the serial printer, for example, the carriage 27 moves in the second direction B1 and a direction opposite thereto.

As shown in FIG. 2, the carriage 27 is displaced to a plurality of positions by moving along the guide 25. The carriage 27 is displaced to a home position P1 and to a return position P2 by moving along the guide 25. The carriage 27 moves between the home position P1 and the return position P2. The carriage 27 is displaced by moving along the guide 25 to a reset position P3 in addition to the home position P1 and the return position P2. The home position P1, the reset position P3, and the return position P2 are arranged in this order in the first direction A1.

The carriage 27 located at the home position P1 is aligned with the support section 17 with respect to one direction. For example, the carriage 27 located at the home position P1 and the support section 17 are arranged in this order in the first direction A1. The carriage 27 located at the return position P2 is aligned with the support section 17 in the one direction. For example, the support section 17 and the carriage 27 located at the return position P2 are arranged in this order in the first direction A1. Therefore, the carriage 27 passes over the print region 19 by moving between the home position P1 and the return position P2. By the carriage 27 moving between the home position P1 and the return position P2, the support section 17 faces the head 28. The carriage 27 moves between the home position P1 and the return position P2 during printing, for example.

The home position P1 is a position where the carriage 27 stands by. Normally the carriage 27 stands by at the home position P1. For example, while the printing section 26 does not perform printing on the medium 99, the carriage 27 is positioned at the home position P1. The home position P1 is, for example, a position upstream of the support section 17 in the first direction A1.

The return position P2 is the position where the carriage 27 switches direction of movement during printing. For example, when the carriage 27 reaches the return position P2 by moving in the first direction A1, the carriage 27 moves from the return position P2 in a direction opposite to the first direction A1, that is, it returns. The return position P2 is, for example, a position downstream of the support section 17 in the first direction A1.

The reset position P3 is a position between the home position P1 and the return position P2 in one direction. When the carriage 27 is positioned at the reset position P3, the output of a linear encoder 35 (to be described later) is reset. The reset position P3 is, for example, a position upstream of the support section 17 in the first direction A1. The reset position P3 may be a position downstream of the support section 17 in the first direction A1.

A plurality of reset positions P3 may be provided. For example, a reset position P3 may be located at both a position upstream of the support section 17 in the first direction A1 and at a position downstream of the support section 17 in the first direction A1.

The carriage 27 may be displaced to a flushing position by moving along the guide 25. The flushing position is, for example, a position between the home position P1 and the return position P2 in one direction. The carriage 27 is displaced to the flushing position when the printing section 26 performs flushing. Flushing is the discharge of liquid that does not contribute to printing. Flushing is performed as needed, for example, before printing, during printing, or after printing. The flushing position is, for example, a position upstream of the support section 17 or downstream of the support section 17 in the first direction A1.

The carriage 27 may be configured to move not only within the region that has the home position P1 and the return position P2 as end sections, but also outside the region that has the home position P1 and the return position P2 as end sections. The carriage 27 may be displaced to a maintenance position located outside the region that has the home position P1 and the return position P2 as end sections. The maintenance position is, for example, a position upstream of the home position P1 in the first direction A1 or a position downstream of the return position P2 in the first direction A1. The carriage 27 is displaced to the maintenance position when, for example, a user performs maintenance on the printing section 26.

The carriage 27 has two ends with respect to one direction. The carriage 27 includes, for example, a first carriage end section 27A and a second carriage end section 27B in the first direction A1. Of the two ends, the first carriage end section 27A is the one that is closer to the home position P1 when the carriage 27 is located between the home position P1 and the return position P2. Of the two ends, the second carriage end section 27B is the one that is closer to the return position P2 when the carriage 27 is located between the home position P1 and the return position P2.

The head 28 has one or more nozzles. The head 28 ejects liquid from the nozzles. The head 28 ejects liquid onto the medium 99 supported by the support section 17. Specifically, the head 28 ejects liquid to the print region 19. The head 28 ejects liquid onto the medium 99 while transport of the medium 99 by the transport section 22 is stopped. Thus, an image is printed on the medium 99.

The head 28 ejects, for example, a plurality of types of liquids. The head 28 ejects, for example, cyan ink, magenta ink, yellow ink, and black ink. The head 28 may eject a reaction liquid in addition to the ink. The reaction liquid is, for example, a liquid that promotes fixing of the ink to the medium 99.

The head 28 moves with respect to the support section 17 together with the carriage 27. The head 28 ejects liquid onto the medium 99 while moving together with the carriage 27. Specifically, the head 28 ejects liquid onto the medium 99 while moving in one direction together with the carriage 27. For example, the head 28 ejects liquid onto the medium 99 while moving in the first direction A1, or in the opposite direction thereof, together with the carriage 27. In the serial printer, for example, the head 28 ejects liquid onto the medium 99 while moving in the second direction B1, or in the opposite direction thereof, together with the carriage 27.

The head 28 has two ends with respect to one direction. The head 28 has, for example, a first head end section 28A and a second head end section 28B with respect to the first direction A1. Of the two end sections, the first head end section 28A is the end section closer to the home position P1 in a state where the carriage 27 is positioned between the home position P1 and the return position P2. Of the two end sections, the second head end section 28B is the end section closer to the return position P2 in a state where the carriage 27 is positioned between the home position P1 and the return position P2.

The width of the head 28 is, for example, equal to the width of the medium 99 or greater than the width of the medium 99. In other words, the head 28 is, for example, a line head capable of simultaneously ejecting liquid over the entire width of the medium 99. Accordingly, the head 28 can eject liquid to the entire region of the print region 19 only by moving once in the first direction A1, or in the opposite direction thereof, together with the carriage 27.

The width of the head 28 may be smaller than the width of the medium 99. In this case, the head 28 can eject liquid over the entire width of the medium 99 by moving in both the first direction A1 and in the second direction B1. For example, the carriage 27 moves in the second direction B1 together with the guide 25. Alternatively, a guide extending in the second direction B1 may be provided separately from the guide 25, and the head 28 may be moved in the second direction B1 along this guide. By this, the head 28 prints over the entire print region 19. When the guide 25 extends in the second direction B1, that is, when the printing device 11 is a serial printer, the carriage 27 moves in the second direction B1.

The printing section 26 performs, for example, unidirectional printing on the medium 99. Unidirectional printing is a printing method in which a single movement direction of the carriage 27 accompanies ejection of liquid to the medium 99. In unidirectional printing, the printing section 26 ejects liquid onto the medium 99, for example, as it moves in either the first direction A1 or in the opposite direction. That is, unidirectional printing is a printing method in which, when the carriage 27 reciprocates with respect to the medium 99, liquid is ejected by the head 28 in either the forward path or in the return path.

The printing section 26 may perform bidirectional printing on the medium 99. Bidirectional printing is a printing method in which a plurality of movement directions of the carriage 27 accompany ejection of liquid to the medium 99. In bi-directional printing, for example, the printing section 26 ejects liquid as it moves in the first direction A1 and in the opposite direction. That is, bidirectional printing is a printing method in which, when the carriage 27 reciprocates with respect to the medium 99, liquid is ejected by the head 28 in both the forward path and in the return path.

The printing device 11 may include a flushing receiver 29. The flushing receiver 29 is a member that receives liquid from flushing of the head 28. By flushing, clogging of the nozzle is suppressed. The flushing receiver 29 is aligned with the support section 17 in one direction. For example, the flushing receiver 29 is located upstream of the support section 17 in the first direction A1. The flushing receiver 29 may be located downstream of the support section 17 in the first direction A1. The flushing receiver 29 faces the head 28 when the carriage 27 is located at the flushing position.

The flushing receiver 29 has two ends with respect to one direction. The flushing receiver 29 has, for example, a first receiving end section 29A and a second receiving end section 29B. Of the two end sections, the first receiving end section 29A is the end section closer to the home position P1. Of the two end sections, the second receiving end section 29B is the end section closer to the return position P2.

As shown in FIG. 1, the printing device 11 includes a motor 31. The motor 31 is coupled to the carriage 27. The motor 31 moves the carriage 27 along the guide 25. For example, the motor 31 moves the carriage 27 along the guide 25 between the home position P1 and the return position P2.

The printing device 11 includes a rotary encoder 32. The rotary encoder 32 detects a rotation angle of the motor 31. The position of the carriage 27 is detected by the output of the rotary encoder 32.

The printing device 11 includes a control section 33. The control section 33 integrally controls the printing device 11. The control section 33 controls, for example, the attraction section 21, the transport section 22, the printing section 26, and the like. The control section 33 controls transport of the medium 99 and printing on the medium 99. The control section 33 alternately executes transport of the medium 99 and printing on the medium 99.

The control section 33 controls the movement of the carriage 27 based on the output of the rotary encoder 32. For example, the control section 33 detects that the carriage 27 is positioned at the home position P1 based on the output of the rotary encoder 32. For example, the control section 33 detects that the carriage 27 is positioned at the return position P2 based on the output of the rotary encoder 32. For example, the control section 33 detects that the carriage 27 is positioned at the reset position P3 based on the output of the rotary encoder 32. For example, the control section 33 detects that the carriage 27 is located at the flushing position and located at the maintenance position, based on the output of the rotary encoder 32. Therefore, the home position P1, the return position P2, the flushing position, and the maintenance position are positions determined based on the output of the rotary encoder 32.

The control section 33 controls the ejection timing of liquid by the head 28 based on the output of the linear encoder 35. Specifically, the control section 33 controls ejection timing of liquid by the head 28 with reference to the reset position P3 based on the output of the linear encoder 35.

The control section 33 may be constituted by one or more processors that execute various processes in accordance with computer programs. The control section 33 may be configured by one or more dedicated hardware circuits such as an application specific integrated circuit that executes at least a portion of the various processes. The control section 33 may be configured by a circuit including a combination of a processor and a hardware circuit. The processor includes a CPU and memory such as RAM and ROM. The memory stores program code or instructions configured to cause the CPU to perform operations. The memory, that is, the computer-readable medium, includes any readable medium that can be accessed by a general purpose or special purpose computer.

As shown in FIG. 2, the printing device 11 includes the linear encoder 35. The linear encoder 35 is configured to detect the position of the carriage 27. The linear encoder 35 includes a linear scale 36 and a sensor 37. The linear encoder 35 detects the position of the carriage 27 by the sensor 37 reading the linear scale 36.

The linear scale 36 extends in one direction. The linear scale 36 extends parallel to the guide 25. The linear scale 36 extends, for example, in the first direction A1. The linear scale 36 has a plurality of slits 38. The slits 38 are arranged in one direction. The position of the carriage 27 is detected by the sensor 37 reading the slits 38.

The linear scale 36 has a movement region SA. The movement region SA is a region in which the sensor 37 moves over the linear scale 36. The length of the movement region SA is, for example, shorter than the entire length of the linear scale 36 in one direction. The length of the movement region SA may coincide with the entire length of the linear scale 36 in one direction. When the length of the movement region SA is shorter than the entire length of the linear scale 36, then, for example, a region in which the sensor 37 cannot be positioned may exist at an end section of the linear scale 36.

For example, the length of the movement region SA coincides with the length of distance of movement of the carriage 27 from the home position P1 to the return position P2. In this case, the movement region SA corresponds to a region having the home position P1 and the return position P2 as end sections in a region in which the carriage 27 moves.

The length of the movement region SA may be longer than the length of the distance of movement of the carriage 27 from the home position P1 to the return position P2. For example, in a case where the carriage 27 can move outside the region between the home position P1 and the return position P2, then the length of the movement region SA is longer than the length of the distance that the carriage 27 moves from the home position P1 to the return position P2.

The movement region SA includes one first region S1 and one or more second regions S2. That is, the linear scale 36 has a first region S1 and a second region S2. The first region S1 is a region where the slits 38 are arranged in the linear scale 36. The second region S2 is a region where the slits 38 are not positioned in the linear scale 36. The movement region SA includes, for example, one first region S1 and two second regions S2.

The first region S1 and the second regions S2 are adjacent to each other. The two second regions S2 are located one on either side of the first region S1. Specifically, the two second regions S2 are located upstream and downstream of the first region S1 with respect to the first direction A1. When there is one second region S2, then the second region S2 may be located to one side of the first region S1.

Since a portion of the movement region SA is the first region S1, the length of the first region S1 is shorter compared to a case in which the entire movement region SA were the first region S1. Therefore, for example, compared with the case where the slits 38 are arranged over the entire length of the linear scale 36, the possibility that the positional accuracy of the slits 38 will be degraded is reduced.

The sensor 37 is mounted on the carriage 27. Therefore, the sensor 37 moves in one direction together with the carriage 27. For example, the sensor 37 moves in the first direction A1, or in the opposite direction thereof, together with the carriage 27.

The sensor 37 moves along the linear scale 36. The sensor 37 moves over the linear scale 36. The position of the carriage 27 is detected by moving the sensor 37 over the linear scale 36. The sensor 37 moves in the movement region SA. In other words, the sensor 37 moves between the first region S1 and the second regions S2.

The sensor 37 is displaced to a plurality of positions by moving along the linear scale 36. The sensor 37 is displaced between a first position Q1 and a second position Q2 by moving along the linear scale 36. In the linear scale 36, a first region S1 and a second region S2 are located between the first position Q1 and the second position Q2. By movement of the carriage 27, the sensor 37 moves on the linear scale 36 between the first position Q1 and the second position Q2. The sensor 37 is displaced to a third position Q3, in addition to the first position Q1 and the second position Q2, by moving along the linear scale 36. The first position Q1, the third position Q3, and the second position Q2 are arranged in this order in the first direction A1, for example.

The first position Q1 is a position on the linear scale 36 where the sensor 37 is located when the carriage 27 is located at the home position P1. That is, the first position Q1 is a position corresponding to the home position P1. For example, the first position Q1 is located at an end section of the movement region SA. For example, the first position Q1 is located in the second region S2. The first position Q1 may be located in the first region S1.

The second position Q2 is a position on the linear scale 36 where the sensor 37 is located when the carriage 27 is located at the return position P2. That is, the second position Q2 corresponds to the return position P2. The second position Q2 is located, for example, at an end of the movement region SA. For example, the second position Q2 is located in the second region S2. For example, the second position Q2 is located in a second region S2 that is different from the second region S2 in which the first position Q1 is located. The second position Q2 may be located in the first region S1.

The third position Q3 is a position on the linear scale 36 where the sensor 37 is located when the carriage 27 is located at the reset position P3. That is, the third position Q3 corresponds to the reset position P3. The third position Q3 is located in the first region S1. When there are a plurality of reset positions P3, there are also a plurality of third positions Q3.

The sensor 37 may be displaced on the linear scale 36, for example, to a position corresponding to the flushing position. The sensor 37 may be displaced on the linear scale 36, for example, to a position corresponding to a maintenance position.

When the sensor 37 moves in the first region S1, the control section 33 can control the ejection timing of liquid by the head 28. When the sensor 37 moves in the second region S2, the control section 33 cannot control the ejection timing of liquid by the head 28. Therefore, the sensor 37 needs to be positioned in the first region S1 while the head 28 ejects liquid.

The sensor 37 is located in the first region S1 when the head 28 faces the print region 19. That is, when the head 28 faces the print region 19, the first region S1 is positioned on the linear scale 36 so that the sensor 37 is positioned in the first region S1. When the head 28 faces the print region 19, the sensor 37 is positioned in the first region S1, and thus it is possible for the control section 33 to control the ejection timing of liquid by the head 28 with respect to the print region 19.

In order for the sensor 37 to be positioned in the first region S1 when the head 28 faces the print region 19, the length of first region S1 needs to be as long as or longer than the length of the print region 19. If the length of the first region S1 is shorter than length of the print region 19, then during the process of the carriage 27 moving along the guide 25, the sensor 37 will move to outside the first region S1 even though the head 28 faces the print region 19.

In order to position the sensor 37 in the first region S1 when the head 28 faces the print region 19, it is desirable that length of the first region S1 be as long as or longer than the sum of the lengths of the print region 19 and the head 28. This is because the head 28 will continue to face the print region 19 while the head 28 passes over the print region 19. Thus, the head 28 passes over the print region 19 by moving a distance which is the sum of the length of the print region 19 and the length of the head 28.

The period during which the head 28 passes over the print region 19 is, for example, a period from a state in which one end section of the head 28 and one end section of the support section 17 overlap each other to a state in which the other end section of the head 28 and the other end section of the support section 17 overlap each other. During this period, the head 28 continues to face the print region 19. For example, the head 28 faces the print region 19 during a period from a state in which the second head end section 28B and the first support end section 17A overlap each other to a state in which the first head end section 28A and the second support end section 17B overlap each other. Therefore, the first region S1 is positioned on the linear scale 36 so as to correspond to a region from the position of the carriage 27 where the second head end section 28B and the first support end section 17A overlap each other to the position of the carriage 27 where the first head end section 28A and the second support end section 17B overlap each other.

The length of first region S1 is longer than or equal to the length of the print region 19 with respect to one direction. Specifically, the length of the first region S1 in one direction is as long as or longer than the sum of the lengths of the print region 19 and the head 28 in the one direction. The length of the first region S1 in the first direction A1 is, for example, a first region length LA. The length of the print region 19 in the first direction A1 is, for example, a print region length LB. The length of the head 28 in the first direction A1 is, for example, a head length LC. Therefore, the first region length LA is greater than or equal to the print region length LB. Specifically, the first region length LA is greater than or equal to the sum of the print region length LB and the head length LC. Accordingly, the sensor 37 can be positioned in the first region S1 while the head 28 faces the print region 19. When the plurality of heads 28 are mounted on the carriage 27, the head length LC is a length of a region occupied by the plurality of heads 28 in the carriage 27.

The print region length LB corresponds to, for example, the distance from the first support end section 17A to the second support end section 17B in one direction. The head length LC corresponds to, for example, the distance from the first head end section 28A to the second head end section 28B in one direction.

The head 28 ejects liquid not only to the print region 19 but also to the flushing receiver 29. Therefore, the sensor 37 needs to be positioned in the first region S1 even when the head 28 faces the flushing receiver 29.

The sensor 37 is located in the first region S1 when the head 28 faces the flushing receiver 29. That is, the first region S1 is positioned on the linear scale 36 so that the sensor 37 is positioned in the first region S1 when the head 28 faces the flushing receiver 29. By the sensor 37 being positioned in the first region S1 when the head 28 faces the flushing receiver 29, the control section 33 can control the ejection timing of liquid by the head 28 with respect to the flushing receiver 29.

In order for the sensor 37 to be positioned in the first region S1 when the head 28 faces the flushing receiver 29, the first region S1 needs to be positioned on the linear scale 36 so as to correspond to the position of the carriage 27 where the head 28 faces the flushing receiver 29. Therefore, the sensor 37 needs to be positioned in the first region S1 while the head 28 passes over the flushing receiver 29 and the print region 19. Therefore, in order for the sensor 37 to be positioned in the first region S1 when the head 28 faces the flushing receiver 29, the length of the first region S1 needs to be equal to or longer than the length of a region having the flushing receiver 29 and the support section 17 as end sections.

The period during which the head 28 passes over the flushing receiver 29 and over the print region 19 is a period from a state in which one end section of the head 28 overlaps with an end section of the flushing receiver 29 to a state in which the other end section of the head 28 overlaps with the end section of the support section 17. The period during which the head 28 passes over the flushing receiver 29 and over the print region 19 is, for example, a period from a state in which the second head end section 28B and the first receiving end section 29A overlap each other to a state in which the first head end section 28A and the second supporting end section 17B overlap each other. Therefore, the first region S1 is positioned on the linear scale 36 so as to correspond to a region from the position of the carriage 27 where the second head end section 28B and the first receiving end section 29A overlap each other to the position of the carriage 27 where the first head end section 28A and the second supporting end section 17B overlap each other.

In the one direction, the length of the first region S1 is longer than or equal to the length of a region having the flushing receiver 29 and the support section 17 as ends. The length of the region having the flushing receiver 29 and the support section 17 as end sections is, for example, a region length LD. The lengths of the region having the flushing receiver 29 and the support section 17 as end sections corresponds, for example, to the distance from the first receiving end section 29A to the second support end section 17B. The first region length LA is greater than or equal to the region length LD.

When the sensor 37 moves in the first region S1, the output of the linear encoder 35 changes by the sensor 37 reading the slits 38. The linear encoder 35, for example, outputs a pulse signal by the sensor 37 reading the slits 38.

For example, the control section 33 controls the ejection timing of liquid by the head 28 based on the pulse signal. On the other hand, when the sensor 37 moves in the second region S2, the output of the linear encoder 35 does not change because the sensor 37 cannot read the slits 38.

The control section 33 controls the ejection timing of liquid by the head 28 with reference to the reset position P3. When the sensor 37 moves to the outside of the first region S1, since the sensor 37 cannot read the slits 38, it is difficult for the control section 33 to accurately control the ejection timing of liquid by the head 28 with reference to the reset position P3. That is, when the sensor 37 passes through the second region S2, it is difficult for the control section 33 to accurately control the ejection timing of liquid by the head 28 based on the output of the linear encoder 35. For example, when the sensor 37 moves in the order of the first region S1, the second region S2, and the first region S1, it is difficult for the control section 33 to accurately control the ejection timing of liquid by the head 28 based on the output of the linear encoder 35. Therefore, when the sensor 37 moves from the second region S2 to the first region S1, it is necessary to reset the output of the linear encoder 35.

When the sensor 37 moves from the second region S2 to the first region S1, the control section 33 resets the output of the linear encoder 35 before the head 28 ejects liquid to the print region 19. The control section 33 resets the output of the linear encoder 35 when the carriage 27 reaches the reset position P3 after the sensor 37 moves from the second region S2 to the first region S1. The control section 33 resets the output of the linear encoder 35 when the sensor 37 has moved from the second region S2 to the first region S1 and the sensor 37 reaches the third position Q3. After the output of the linear encoder 35 is reset at the reset position P3, liquid is ejected from the head 28 in a state where the sensor 37 is positioned in the first region S1.

With respect to resetting the output of the linear encoder 35 and the process in which the sensor 37 moves from the second region S2 to the first region S1, it is desirable that the sensor 37 be able to pass through the reset position P3 before the head 28 faces the print region 19. In this case, printing is smoothly performed. For example, while the carriage 27 reciprocates during printing, if the output of the linear encoder 35 is reset immediately before the head 28 faces the print region 19, printing is smoothly executed.

A case of this example in which both the first position Q1 and the second position Q2 are located in the second region S2 will be considered. When unidirectional printing is performed in the forward path, the reset position P3 may be located between the home position P1 and the print region 19 in one direction. In this case, the sensor 37 moves from the second region S2 to the first region S1 as the carriage 27 that was located at the home position P1 moves in the forward path. After the sensor 37 moves to the first region S1, the output of the linear encoder 35 is reset by the carriage 27 reaching the reset position P3. Thereafter, the carriage 27 continues to move in the forward path, whereby the head 28 ejects liquid to the print region 19.

When unidirectional printing is performed in the return path, the reset position P3 may be positioned between the print region 19 and the return position P2 in one direction. In this case, the sensor 37 moves from the second region S2 to the first region S1 by the carriage 27 located at the return position P2 moving in the return path. After the sensor 37 enters the first region S1, the output of the linear encoder 35 is reset by the carriage 27 reaching the reset position P3. Thereafter, the carriage 27 continues to move in the return path, whereby the head 28 ejects liquid to the print region 19.

In the case of bi-directional printing, the reset position P3 may be located, with respect to one direction, between the home position P1 and the print region 19 and between the print region 19 and the return position P2. In this case, the sensor 37 moves from the second region S2 to the first region S1 as the carriage 27 that was located at the home position P1 moves in the forward path. After the sensor 37 enters the first region S1, the output of the linear encoder 35 is reset by the carriage 27 reaching the reset position P3. Thereafter, the carriage 27 continues to move in the forward path, whereby the head 28 ejects liquid to the print region 19. Also, when the carriage 27 located at the return position P2 moves in the return path, the sensor 37 moves from the second region S2 to the first region S1. After the sensor 37 enters the first region S1, the output of the linear encoder 35 is reset by the carriage 27 reaching the reset position P3. Thereafter, the carriage 27 continues to move in the return path, whereby the head 28 ejects liquid to the print region 19.

As described above, the control method of the printing device 11 includes controlling the position of the carriage 27 based on the output of the rotary encoder 32. The control method of the printing device 11 includes controlling the ejection timing of liquid by the head 28 based on the output of the linear encoder 35. The control method of the printing device 11 includes resetting the output of the linear encoder 35 before the head 28 ejects liquid to the print region 19 when the sensor 37 moves from the second region S2 to the first region S1.

Actions and Effects of Printing Device

Next, actions and effects of the above-described embodiment will be described. (1) When the head 28 faces the print region 19, the sensor 37 is positioned in the first region S1. The length of the first region S1 is longer than or equal to the length of the print region 19 in the one direction.

When the head 28 faces the print region 19, for example, when the head 28 prints on the medium 99, the sensor 37 is located in the first region S1. Since the length of the first region S1 is longer than or equal to the length of the print region 19, the sensor 37 continues to be positioned in the first region S1 while the head 28 faces the print region 19. Accordingly, the control section 33 can control the ejection timing of liquid by the head 28 with respect to the print region 19.

According to the above configuration, the slits 38 are arranged in a partial region of the linear scale 36. In this case, the length of the first region S1 is shorter than in the case where the slits 38 are arranged over the entire length of the linear scale 36. Therefore, it is possible to reduce the possibility that the positional accuracy of the slits 38 is lowered. Therefore, the possibility that the print quality deteriorates is reduced.

(2) When the sensor 37 moves from the second region S2 to the first region S1, the control section 33 resets the output of the linear encoder 35 before the head 28 ejects liquid to the print region 19.

When the sensor 37 moves from the first region S1 to the second region S2, the sensor 37 cannot read the slits 38. Therefore, in a case where the sensor 37 moves from the second region S2 to the first region S1, it is difficult for the control section 33 to accurately control the ejection timing of liquid by the head 28 based on the output of the linear encoder 35. Therefore, when the sensor 37 moves from the second region S2 to the first region S1, it is necessary to reset the output of the linear encoder 35. According to the configuration described above, the control section 33 can control the ejection timing of liquid by the head 28 based on the output of the linear encoder 35 that was reset.

(3) When the head 28 faces the flushing receiver 29, the sensor 37 is positioned in the first region S1. With respect to one direction, the length of the first region S1 is longer than or equal to the length of a region having the flushing receiver 29 and the support section 17 as end sections.

According to the configuration described above, the control section 33 can control the ejection timing of liquid by the head 28 with respect to the flushing receiver 29. By this, the control section 33 can cause the flushing receiver 29 to receive the liquid ejected from the head 28 by flushing.

Modifications of Printing Device

The above-described embodiment can be modified as follows. The present embodiment and the following modifications can be implemented in combination with each other within a range where there is no technical contradiction.

First Modification

A first modification of the printing device 11 will be described. In the first modification, the position of the flushing receiver 29 is different from that in the above-described embodiment. The first modification will be mainly described with respect to points different from the above-described embodiment.

Figure 3:
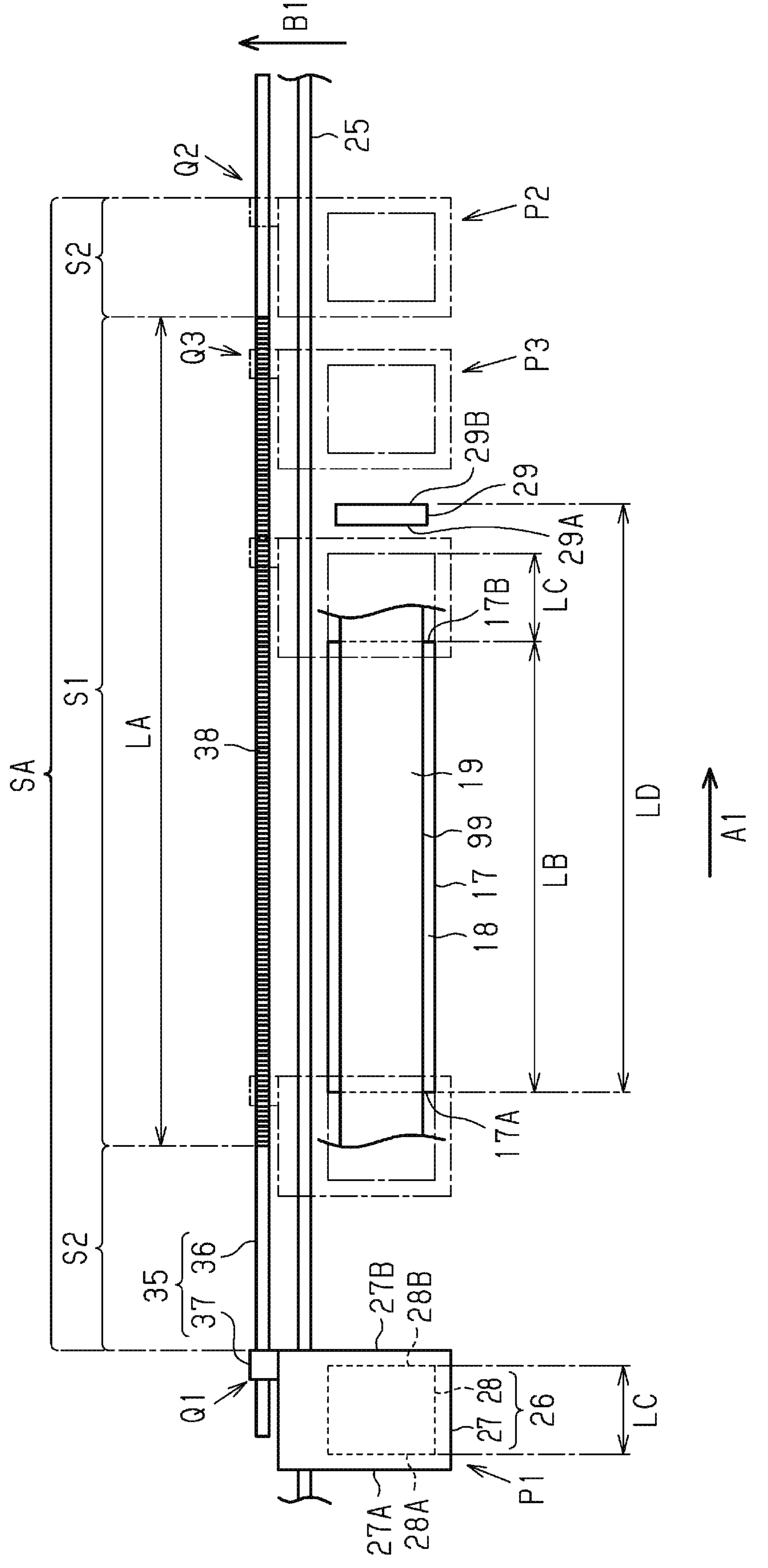
FIG. 3 is a plan view of a printing device according to a first modification.

As shown in FIG. 3, the flushing receiver 29 may be located downstream of the support section 17 in the first direction A1. The flushing receiver 29 faces the head 28 when the carriage 27 is located at the flushing position.

The sensor 37 is located in the first region S1 when the head 28 faces the flushing receiver 29. That is, the first region S1 is positioned on the linear scale 36 so that the sensor 37 is positioned in the first region S1 when the head 28 faces the flushing receiver 29.

In order for the sensor 37 to be positioned in the first region S1 when the head 28 faces the flushing receiver 29, the first region S1 needs to be positioned on the linear scale 36 so as to correspond to the position of the carriage 27 where the head 28 faces the flushing receiver 29. Therefore, the sensor 37 needs to be positioned in the first region S1 while the head 28 passes over the flushing receiver 29 and the print region 19. Therefore, in order for the sensor 37 to be positioned in the first region S1 when the head 28 faces the flushing receiver 29, the length of the first region S1 needs to be equal to or longer than the length of a region having the flushing receiver 29 and the support section 17 as end sections.

The period during which the head 28 passes over the flushing receiver 29 and over the print region 19 is a period from a state in which one end section of the head 28 overlaps with an end section of the flushing receiver 29 to a state in which the other end section of the head 28 overlaps with the end section of the support section 17. In the first modification, the period during which the head 28 passes over the flushing receiver 29 and over the print region 19 is a period from a state in which the second head end section 28B and the first support end section 17A overlap each other to a state in which the first head end section 28A and the second receiving end section 29B overlap each other. Therefore, in the first modification, the first region S1 is positioned on the linear scale 36 so as to correspond to a region from the position of the carriage 27 where the second head end section 28B and the first support end section 17A overlap each other to the position of the carriage 27 where the first head end section 28A and the second receiving end section 29B overlap each other.

In the one direction, the length of the first region S1 is longer than or equal to the length of a region having the flushing receiver 29 and the support section 17 as ends. The length of the region having the flushing receiver 29 and the support section 17 as end sections is, for example, a region length LD. In the first modification, the length of the region including the flushing receiver 29 and the support section 17 corresponds to the distance from the first support end section 17A to the second receiving end section 29B. The first region length LA is greater than or equal to the region length LD. According to the first modification, the same effects as those of the above embodiment can be obtained.

Second Modification

Next, a second modification of the printing device 11 will be described. The second modification is different from the above-described embodiment in that the second region S2 is located on only one side of the first region S1. The second modification will be mainly described with respect to points different from the above-described embodiment.

Figure 4:
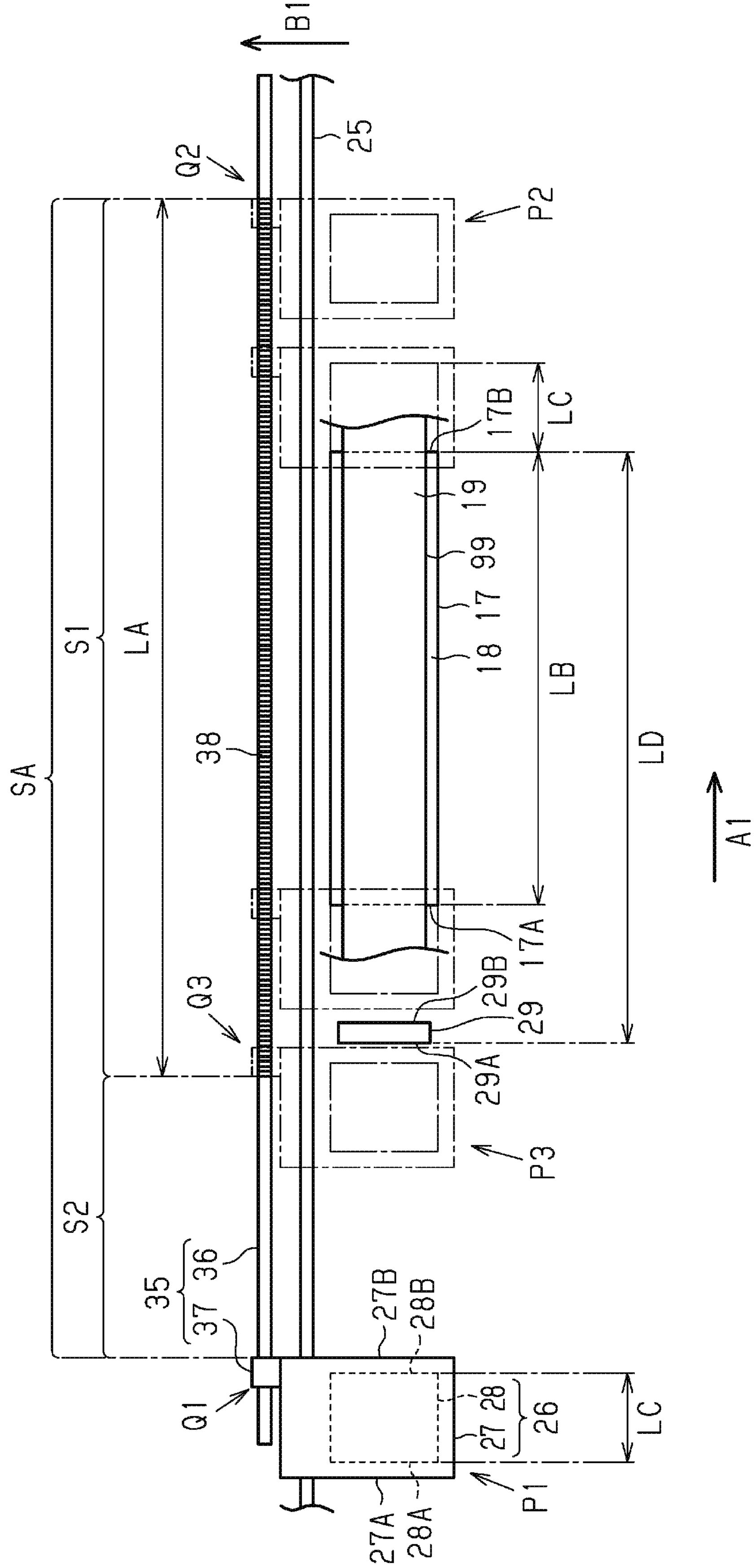
FIG. 4 is a plan view of a printing device according to a second modification.
Figure 5:
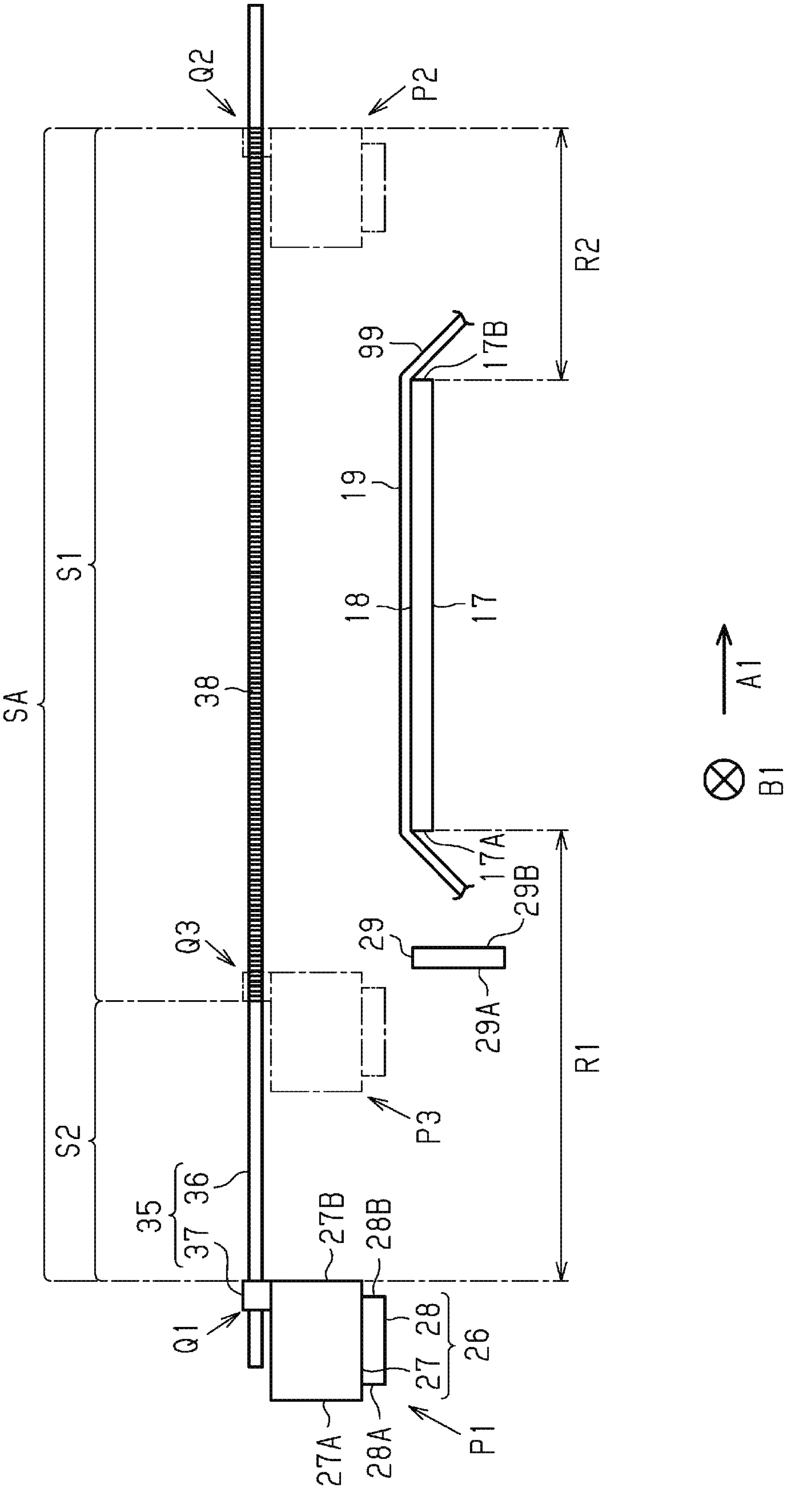
FIG. 5 is a front view of the printing device shown in FIG. 4.

As shown in FIGS. 4 and 5, one second region S2 may be provided in the movement region SA. The second region S2 is located on one side of the first region S1. In the second modification, the second region S2 is located upstream of the first region S1 in the first direction A1. Also in the second modification, since a portion of the movement region SA is the first region S1, the length of the first region S1 is shorter than a case in which the entire movement region SA is the first region S1. Therefore, for example, compared with the case where the slits 38 are arranged over the entire length of the linear scale 36, the possibility that the positional accuracy of the slits 38 will be degraded is reduced.

In the second modification, the first position Q1 is located in the second region S2. On the other hand, the second position Q2 is located in the first region S1. In this case, when the carriage 27 is positioned at the return position P2, the sensor 37 is not positioned at the second region S2.

As shown in FIG. 5, with respect to one direction, the movement distance of the carriage 27 from the home position P1 to the support section 17 is longer than the movement distance of the carriage 27 from the return position P2 to the support section 17. The movement distance of the carriage 27 from the home position P1 to the support section 17 is, for example, a first distance R1. The movement distance of the carriage 27 from the return position P2 to the support section 17 is, for example, a second distance R2. In the second modification, the first distance R1 is longer than the second distance R2.

The movement distance of the carriage 27 from the home position P1 to the support section 17 corresponds to, for example, the distance from the second carriage end section 27B of the carriage 27 positioned at the home position P1 to the first support end section 17A. In this case, the movement distance of the carriage 27 from the return position P2 to the support section 17 corresponds to the distance from the second carriage end section 27B of the carriage 27 located at the return position P2 to the second support end section 17B.

The movement distance of the carriage 27 from the home position P1 to the support section 17 may correspond to, for example, the distance from the first carriage end section 27A of the carriage 27 positioned at the home position P1 to the first support end section 17A. In this case, the movement distance of the carriage 27 from the return position P2 to the support section 17 corresponds to the distance from the first carriage end section 27A of the carriage 27 located at the return position P2 to the second support end section 17B.

According to the second modification, the following effects can be obtained in addition to the effects of the above-described embodiment. (4) The second position Q2 is located in the first region S1. According to the above configuration, when the carriage 27 is positioned at the return position P2, the sensor 37 is not positioned at the second region S2. Therefore, for example, when the carriage 27 moves from the return position P2 to the home position P1, it is not necessary to reset the output of the linear encoder 35. Therefore, it is possible to reduce the frequency of resetting the output of the linear encoder 35 compared to a case in which the sensor 37 moves to the second region S2 when the carriage 27 moves to the return position P2.

(5) With respect to one direction, the movement distance of the carriage 27 from the home position P1 to the support section 17 is longer than the movement distance of the carriage 27 from the return position P2 to the support section 17.

According to the above-described configuration, the length of the first region S1 is shorter than in a case where the movement distance of the carriage 27 from the home position P1 to the support section 17 is shorter than the movement distance of the carriage 27 from the return position P2 to the support section 17. Therefore, it is possible to reduce the possibility that positional accuracy of the slits 38 is lowered.

Third Modification

Next, a third modification of the printing device 11 will be described. In the third modification, the position of the second region S2 is different from that in the second modification. Regarding the third modification, points different from the second modification will be mainly described.

Figure 6:
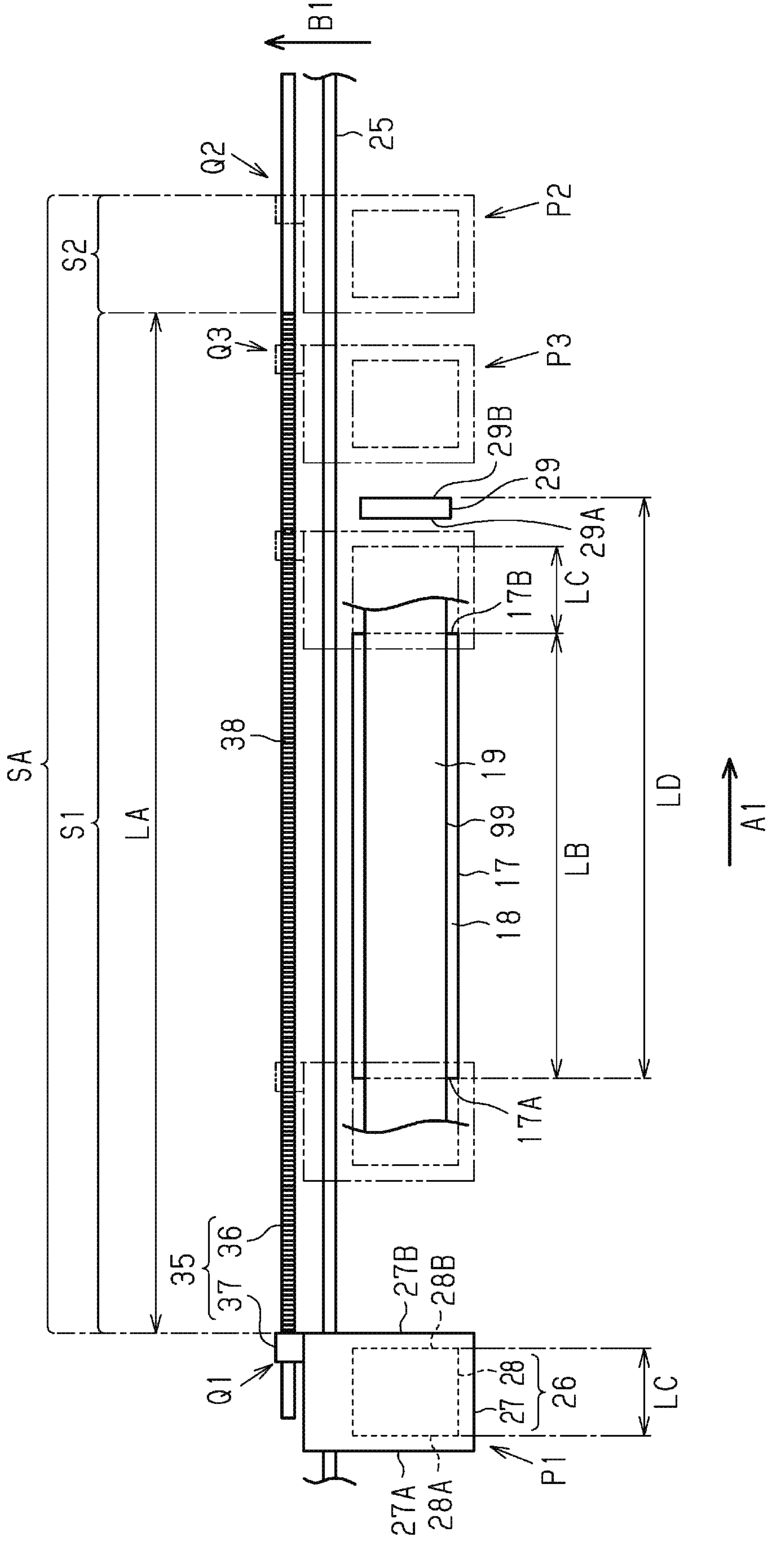
FIG. 6 is a plan view of a printing device according to a third modification.
Figure 7:
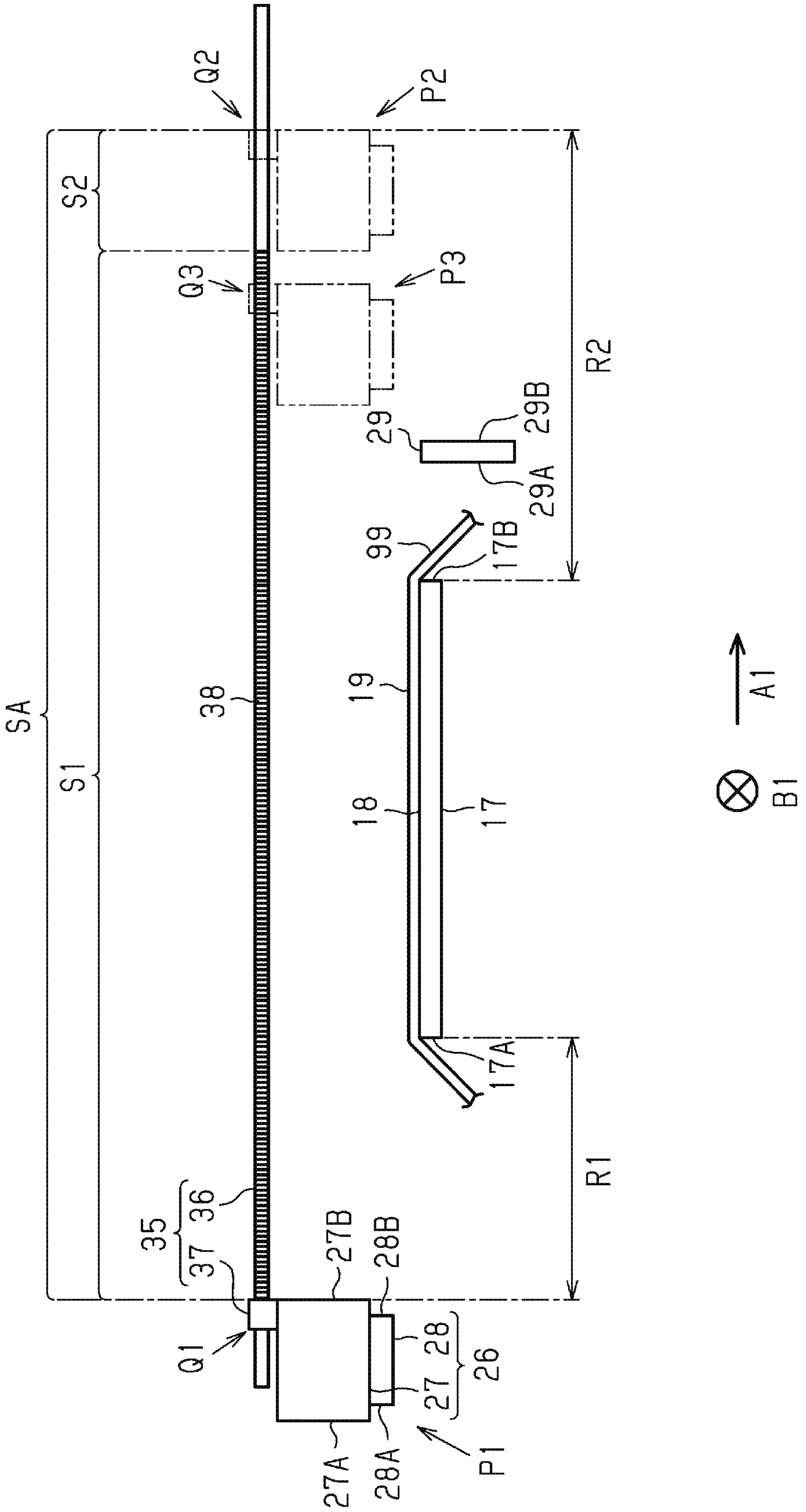
FIG. 7 is a front view of the printing device shown in FIG. 6.

As shown in FIGS. 6 and 7, a single second region S2 may be provided in the movement region SA. The second region S2 is located on one side of the first region S1. In the third modification, the second region S2 is located downstream of the first region S1 in the first direction A1. Also in the third modification, since a portion of the movement region SA is the first region S1, the length of the first region S1 is shorter than the case where the entire movement region SA is the first region S1. Therefore, for example, compared with the case where the slits 38 are arranged over the entire length of the linear scale 36, the possibility that the positional accuracy of the slits 38 will be degraded is reduced.

In the third modification, the first position Q1 is located in the first region S1. On the other hand, the second position Q2 is located in the second region S2. In this case, when the carriage 27 is positioned at the home position P1, the sensor 37 is not positioned at the second region S2.

As shown in FIG. 7, with respect to the one direction, the movement distance of the carriage 27 from the home position P1 to the support section 17 is shorter than the movement distance of the carriage 27 from the return position P2 to the support section 17. The movement distance of the carriage 27 from the home position P1 to the support section 17 is, for example, a first distance R1. The movement distance of the carriage 27 from the return position P2 to the support section 17 is, for example, a second distance R2. In the third modification, the first distance R1 is shorter than the second distance R2.

According to the third modification, the following effects can be obtained in addition to the effects of the above-described embodiment. (6) The first position Q1 is located in the first region S1. According to the above configuration, when the carriage 27 is located at the home position P1, the sensor 37 is not located in the second region S2. Therefore, for example, when the carriage 27 moves from the home position P1 to the return position P2, it is not necessary to reset the output of the linear encoder 35. Therefore, it is possible to reduce the frequency of resetting the output of the linear encoder 35 as compared with a case where the sensor 37 moves to the second region S2 when the carriage 27 moves to the home position P1.

(7) With respect to one direction, the movement distance of the carriage 27 from the home position P1 to the support section 17 is shorter than the movement length of the carriage 27 from the return position P2 to the support section 17.

According to the above-described configuration, the length of the first region S1 is shorter than in a case where the movement distance of the carriage 27 from the home position P1 to the support section 17 is longer than the movement distance of the carriage 27 from the return position P2 to the support section 17. Therefore, it is possible to reduce the possibility that positional accuracy of the slits 38 is lowered.

Other Modifications

The control section 33 may detect that the carriage 27 is positioned at the reset position P3 by, for example, a switch that comes into contact with the carriage 27, and is not limited to using the output of the rotary encoder 32. The control section 33 may detect the home position P1 and the return position P2 using a similar technique.

The liquid ejected by the head 28 is not limited to ink, and may be, for example, a liquid material in which particles of a functional material are dispersed in or mixed with a liquid. For example, the head 28 may eject a liquid material containing a material, in a dispersed or dissolved form, such as an electrode material or a pixel material used for manufacturing liquid crystal displays, electroluminescence displays, or surface light emission displays.

Technical Ideas

Hereinafter, technical ideas grasped from the above-described embodiment and modifications, and actions and effects thereof, will be described.

(A) A printing device includes a support section configured to support a medium; a head configured to eject liquid onto a print region of the medium, the print region being a region of the medium that is supported by the support section; a carriage on which the head is mounted; a guide that supports the carriage and that extends in one direction; a motor configured to move the carriage along the guide between a home position and a return position; a rotary encoder for detecting a rotation angle of the motor; a linear encoder configured to detect a position of the carriage; and a control section, wherein the control section controls a position of the carriage based on output of the rotary encoder and controls ejection timing of liquid by the head based on output of the linear encoder, the support section faces the head by the carriage moving between the home position and the return position, the linear encoder includes a linear scale that extends in the one direction and that has a plurality of slits arranged in the one direction and a sensor that is attached to the carriage and that is configured to detect the slits, by movement of the carriage, the sensor moves over the linear scale between a first position and a second position, the first position is a position on the linear scale where the sensor is located when the carriage is located at the home position, the second position is a position on the linear scale where the sensor is located when the carriage is located at the return position, the linear scale includes, between the first position and the second position, a first region in which the plurality of slits are located and a second region in which the plurality of slits are not located, the sensor is located in the first region when the head faces the print region, and a length of the first region in the one direction is greater than or equal to a length of the print region in the one direction.

When the head faces the print region, for example when the head prints on the medium, the sensor is located in the first region. Since the length of the first region is greater than or equal to the length of the printing region, the sensor continues to be positioned in the first region while the head faces the printing region. Accordingly, the control section can control the ejection timing of liquid by the head with respect to the printing region.

According to the above configuration, the slits are arranged in a partial region of the linear scale. In this case, the length of the first region is shorter than in the case where the slits are arranged over the entire length of the linear scale. Therefore, it is possible to reduce the possibility that the positional accuracy of the slits is lowered. Therefore, the possibility that the print quality deteriorates is reduced.

(B) In the above-described printing device, when the sensor moves from the second region to the first region, the control section may reset output of the linear encoder before the head ejects liquid to the printing region.

When the sensor moves from the first region to the second region, the sensor cannot read the slits. Therefore, in a case where the sensor moves from the second region to the first region, it is difficult for the control section to accurately control the ejection timing of liquid by the head based on the output of the linear encoder. Therefore, when the sensor moves from the second region to the first region, it is necessary to reset the output of the linear encoder. According to the configuration described above, the control section can control the ejection timing of liquid by the head based on the output of the linear encoder that was reset.

(C) The above-described printing device may be such as to further include a flushing receiver configured to receive liquid ejected from the head by flushing, wherein the flushing receiver is arranged with the support section in the one direction, and the sensor is positioned in the first region when the head faces the flushing receiver and the length in the one direction of the first region is greater than or equal to a length in the one direction of a region having the flushing receiver and the support section as end sections.

According to the configuration described above, the control section can control the ejection timing of liquid by the head with respect to the flushing receiver. By this, the control section can cause the flushing receiver to receive the liquid ejected from the head by flushing.

(D) In the above-described printing device, the second position may be located in the first region. According to the above configuration, when the carriage is positioned at the return position, the sensor is not positioned in the second region. Therefore, for example, when the carriage moves from the return position to the home position, it is not necessary to reset the output of the linear encoder. Therefore, it is possible to reduce the frequency of resetting the output of the linear encoder as compared with a case where the sensor moves to the second region by moving the carriage to the return position.

(E) In the above-described printing device, in the one direction, a movement distance of the carriage from the home position to the support section may be longer than a movement distance of the carriage from the return position to the support section.

According to the above configuration, the length of the first region is shorter than in a case where the movement distance of the carriage from the home position to the support section is shorter than the movement distance of the carriage from the return position to the support section. Therefore, it is possible to reduce the possibility that the positional accuracy of the slits is lowered.

(F) The first position may be located in the first region. According to the above configuration, when the carriage is located at the home position, the sensor is not located in the second region. Therefore, for example, when the carriage moves from the home position to the return position, it is not necessary to reset the output of the linear encoder. Therefore, it is possible to reduce the frequency of resetting the output of the linear encoder as compared with a case where the sensor moves to the second region when the carriage moves to the home position.

(G) In the above-described printing device, in the one direction, a movement distance of the carriage from the home position to the support section may be shorter than a movement distance of the carriage from the return position to the support section.

According to the above configuration, the length of the first region is shorter than in a case where the movement distance of the carriage from the home position to the support section is longer than the movement distance of the carriage from the return position to the support section. Therefore, it is possible to reduce the possibility that the positional accuracy of the slits is lowered.

(H) A printing device control method for a printing device including a support section configured to support a medium, a head configured to eject liquid onto a print region of the medium, the print region being a region of the medium that is supported by the support section, a carriage on which the head is mounted, a guide that supports the carriage and that extends in one direction, a motor configured to move the carriage along the guide between a home position and a return position, a rotary encoder for detecting a rotation angle of the motor, and a linear encoder configured to detect a position of the carriage, the support section faces the head by the carriage moving between the home position and the return position, the linear encoder includes a linear scale that extends in the one direction and that has a plurality of slits arranged in the one direction and a sensor that is attached to the carriage and that is configured to detect the slits, by movement of the carriage, the sensor moves over the linear scale between a first position and a second position, the first position is a position on the linear scale where the sensor is located when the carriage is located at the home position, the second position is a position on the linear scale where the sensor is located when the carriage is located at the return position, the linear scale includes, between the first position and the second position, a first region in which the plurality of slits are located and a second region in which the plurality of slits are not located, the sensor is located in the first region when the head ejects liquid at the print region, and a length of the first region in the one direction is longer than a length of the print region in the one direction, the printing device control method comprising: controlling position of the carriage based on output of the rotary encoder; controlling ejection timing of the liquid by the head based on output of the linear encoder; and when the sensor moves from the second region to the first region, output of the linear encoder is reset before the head ejects liquid to the printing region.

According to the method described above, similar effects as those of the printing device described above can be obtained.

What is claimed is:

1. A printing device comprising:

a support section configured to support a medium;

a head configured to eject liquid onto a print region of the medium, the print region being a region of the medium that is supported by the support section;
a carriage on which the head is mounted;
a guide that supports the carriage and that extends in one direction;
a motor configured to move the carriage along the guide between a home position and a return position;
a rotary encoder for detecting a rotation angle of the motor;
a linear encoder configured to detect a position of the carriage; and
a control section, wherein
the control section controls a position of the carriage based on output of the rotary encoder and controls ejection timing of liquid by the head based on output of the linear encoder,
the support section faces the head by the carriage moving between the home position and the return position,
the linear encoder includes
a linear scale that extends in the one direction and that has a plurality of slits arranged in the one direction and
a sensor that is attached to the carriage and that is configured to detect the slits,
by movement of the carriage, the sensor moves over the linear scale between a first position and a second position,
the first position is a position on the linear scale where the sensor is located when the carriage is located at the home position,
the second position is a position on the linear scale where the sensor is located when the carriage is located at the return position,
the linear scale includes, between the first position and the second position, a first region in which the plurality of slits are located and a second region in which the plurality of slits are not located,
the sensor is located in the first region when the head faces the print region, and
a length of the first region in the one direction is greater than or equal to a length of the print region in the one direction.

2. The printing device according to claim 1, wherein:
when the sensor moves from the second region to the first region, the control section resets output of the linear encoder before the head ejects liquid to the printing region.

3. The printing device according to claim 1, further comprising:
a flushing receiver configured to receive liquid ejected from the head by flushing, wherein
the flushing receiver is arranged with the support section in the one direction, and the sensor is positioned in the first region when the head faces the flushing receiver and
the length in the one direction of the first region is greater than or equal to a length in the one direction of a region having the flushing receiver and the support section as end sections.

4. The printing device according to claim 1, wherein:
the second position is located in the first region.

5. The printing device according to claim 4, wherein
in the one direction, a movement distance of the carriage from the home position to the support section is longer than a movement distance of the carriage from the return position to the support section.

6. The printing device according to claim 1, wherein:
the first position is located in the first region.

7. The printing device according to claim 6, wherein
in the one direction, a movement distance of the carriage from the home position to the support section is shorter than a movement distance of the carriage from the return position to the support section.

8. A printing device control method for a printing device including
a support section configured to support a medium,
a head configured to eject liquid onto a print region of the medium, the print region being a region of the medium that is supported by the support section,
a carriage on which the head is mounted,
a guide that supports the carriage and that extends in one direction,
a motor configured to move the carriage along the guide between a home position and a return position,
a rotary encoder for detecting a rotation angle of the motor, and
a linear encoder configured to detect a position of the carriage, wherein
the support section faces the head by the carriage moving between the home position and the return position,
the linear encoder includes
a linear scale that extends in the one direction and that has a plurality of slits arranged in the one direction and
a sensor that is attached to the carriage and that is configured to detect the slits,
by movement of the carriage, the sensor moves over the linear scale between a first position and a second position,
the first position is a position on the linear scale where the sensor is located when the carriage is located at the home position,
the second position is a position on the linear scale where the sensor is located when the carriage is located at the return position,
the linear scale includes, between the first position and the second position, a first region in which the plurality of slits are located and a second region in which the plurality of slits are not located,
the sensor is located in the first region when the head ejects liquid at the print region, and
a length of the first region in the one direction is longer than a length of the print region in the one direction, the printing device control method comprising:
controlling position of the carriage based on output of the rotary encoder;
controlling ejection timing of the liquid by the head based on output of the linear encoder; and
when the sensor moves from the second region to the first region, output of the linear encoder is reset before the head ejects liquid to the printing region.

* * * * *